Feb. 14, 1961    L. BENDER    2,971,534
GASTIGHT SHUTOFF DEVICE FOR THE PASSAGE OF
DUST-CONTAINING SUBSTANCES

Filed Aug. 20, 1957    2 Sheets-Sheet 1

INVENTOR
LUDWIG BENDER

BY

*Connolly and Hutz*

HIS ATTORNEYS

INVENTOR
Ludwig Bender

United States Patent Office 2,971,534
Patented Feb. 14, 1961

2,971,534

GASTIGHT SHUTOFF DEVICE FOR THE PASSAGE OF DUST-CONTAINING SUBSTANCES

Ludwig Bender, Bruhl, near Cologne, Germany, assignor to Knapsack-Griesheim Aktiengesellschaft, Knapsack, near Koln, Germany, a corporation of Germany Filed Aug. 20, 1957, Ser. No. 679,193

4 Claims. (Cl. 137—613)

The present invention relates to a gastight shutoff device for the passage of dust-containing substances such as solids, gases or vapors.

In practice, the introduction of solids into gastight closed apparatus by means of a sluice is generally carried out according to the known double sluice principle. For this purpose two of the usual gastight closing devices are used between which a space is arranged which is sealed so as to be gastight and which serves as a sluice. This mode of operation is applicable only to substances which do not contaminate the packings. It may, for example, be used for introducing portions of metals by means of a sluice into a gastight apparatus which is, for example, under an atmosphere of inert gas.

The usual gastight closing devices cannot, however, be used for the introduction of dust-containing material as the dust depositing on the packing surfaces jeopardizes a satisfactory packing.

Now, I have found that the aforesaid disadvantage can be avoided by proceeding in such a manner that, during the passage of the material through the shutoff device, the gas check proper is in a space which is separated from the dust-containing material passing through the shutoff device. The present invention thus provides a gastight shutoff device through which dust-containing solids, gases or vapors can be passed without contamination of the packings taking place. This is achieved, according to the invention, by installing a protective tube which is open at both ends and which can be displaced in axial direction between the short feed pipe and the short receiving pipe of the shutoff device. That end of the protective tube which faces the short feed pipe is sealed in a dust-tight manner from the valve housing. When the shutoff device is closed, i.e. when the protective tube is extended, the end of the short receiving pipe which projects into the valve housing is closed by a valve disk which rests in a gastight manner upon a packing surface arranged at said end of the short receiving pipe. When the shutoff device is open and the protective tube is retracted into the short receiving pipe— after the valve disk has been swung out within the valve housing—that end of the protective tube which faces the short receiving pipe is seated in a gastight manner on a valve seat by means of a valve ring mounted on the protective tube, the valve seat being installed at that end of the short receiving pipe which projects into the valve housing. The terms "retracted" and "extended" refer to the position of the protective tube with respect to the short receiving pipe.

At the end of the short receiving pipe that projects into the valve housing, a valve seat is arranged which is provided with a packing surface for the valve ring of the protective tube and with a packing surface for the valve disk.

The packing surface of the valve seat for the valve ring consists of a tapered bore. The packing surface of the valve seat for the valve disk is at right angles to the direction of movement of the protective tube. The contact surface of the valve disk may be provided with a packing ring which may be, for example, of rubber. This packing ring is fixed in a dovetailed groove of the valve disk. The contact surface of the valve ring may be provided with a packing ring which, for example, may be of rubber.

According to the invention, the dust-tight shutoff member permitting the axial displacement of the protective tube and which is arranged between the valve housing and the end of the protective tube that faces the short feed pipe may consist of bellows of metal or rubber, a filter bag, a stuffing box or the like.

According to a further feature of the present invention, the rim of the open end of the protective tube that faces the short receiving pipe surmounts the valve ring installed at this end of the protective tube. When the protective tube is extended and even when it is retracted, the short feed pipe projects into and is embraced by the open end of the protective tube that faces the short feed pipe, whereas the open end of the protective tube that faces the short receiving pipe projects into and is embraced by said receiving pipe when the protective tube is retracted. The diameter of the end of the protective tube that faces the short feed pipe may be greater than that of the end facing the short receiving pipe.

The apparatus of the invention may include a lever arrangement with a tension and tightening screw for extending and retracting the protective tube and for pressing on the packing surface between the valve ring and the valve seat when the protective tube is retracted. It furthermore comprises a bridge which, when the protective tube is being extended, is somewhat lifted by striking the backside of the valve ring and which is connected with a guide rail provided with a guide groove for the valve disk, all these parts following automatically the movement of the bridge.

A rocking lever is provided for swinging on and out the valve disk in a lifted state within the valve housing. In this manner, friction between the valve disk and the packing surface at the end of the short receiving pipe during the swinging on and out is avoided.

In the upper part of the valve housing there may be arranged guide members for the displaceable protective tube which may consist of projecting sheets, rolls, springs or the like.

According to a further feature of the invention, the short feed pipe is provided with a swingable hinged cover for the material which cover closes the short feed pipe when the protective tube and the valve disk are being operated and thus prevents contamination of the valve housing.

After withdrawal of the short feed pipe, the end of the protective tube that faces said feed pipe may be occluded by a mounting support with a sight glass. In this manner dust-producing processes taking place in a gastight closed apparatus may be observed through the sight glass. In the shutoff device of the invention, the sight glass may be withdrawn in order to be cleaned after the protective tube has been extended and the valve disk has been swung on, without communication with the exterior taking place, which would disturb the operation of the apparatus.

Since the shutoff device of the invention cannot be used itself as a cover for the material, a known cover, for example, a mushroom valve, is to be connected in series before the shutoff device. The material is only passed through the shutoff device after the latter has been completely opened by swinging out the valve disk and after the protective tube has been retracted.

When connected with a sluice, the shutoff device of the invention renders it possible, for example, not only to introduce dust-containing material into an evacuated vessel but also to remove it therefrom. Similarly, dust-containing material may be conveyed from one container to another one being under a different pressure.

A further field of application for the shutoff device of the invention is offered by the possibility to use it like other valves and the like sensitive to dust.

It may be used with the protective tube being in vertical or oblique position. When gases or vapors are passed through the protective tube may even be in horizontal position.

Several modes of construction of the shutoff device of the invention are illustrated diagrammatically and partly in sectional elevation in the accompanying drawings by way of example:

Referring to the drawings.

Figure 1:
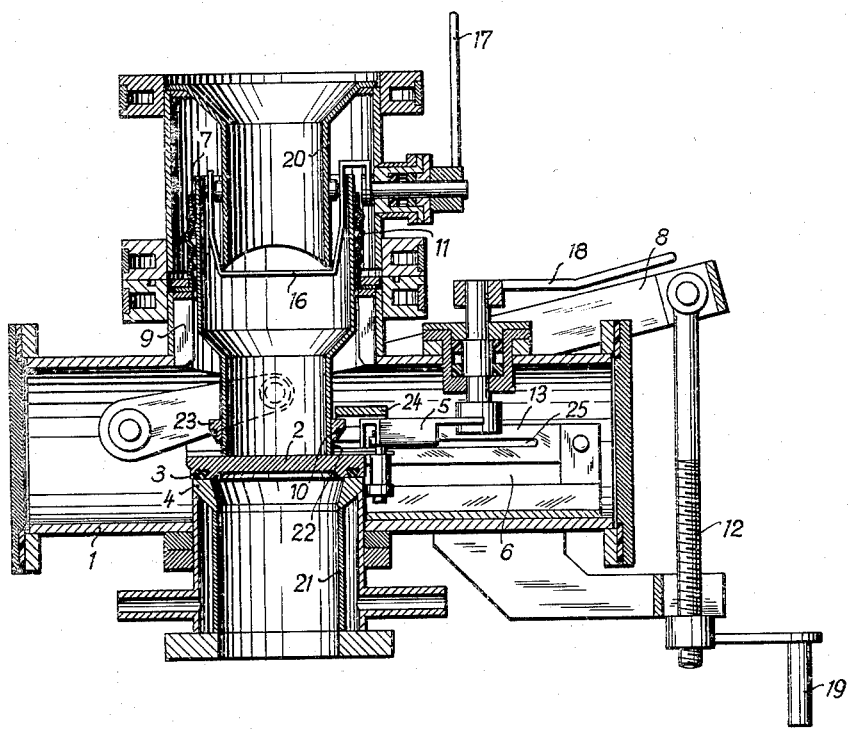
Figure 1 is a side elevation in section of a shutoff device in closed position with extended protective tube.

In Figure 1, the valve housing is designated by 1, the valve disk by 2; the packing ring on the contact surface of the valve disk 2, which packing ring may be, for example, of rubber, is denoted by 3 and the valve seat by 4. The valve seat 4 is provided with a taper bore for the valve ring 23. The latter is provided with a packing ring 10 which is also formed of rubber.

The valve ring 23 is arranged at that open end of the protective tube 7 which faces the short receiving pipe 21. The other open end of the protective tube facing the short feed pipe 20 is connected with the valve housing 1 in a dust-tight manner.

Figure 2:
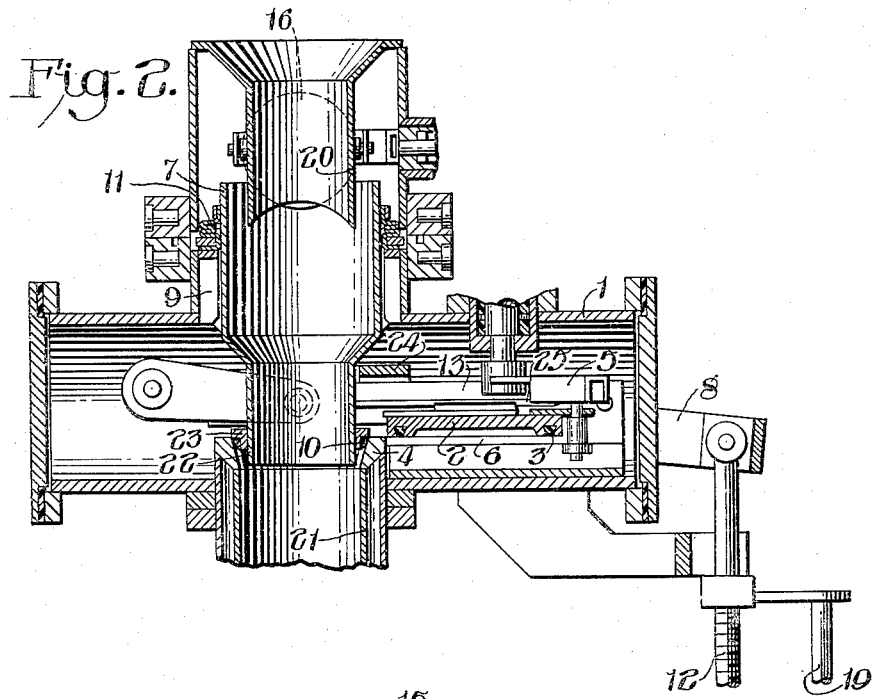
Figure 2 is a side elevation in section of the shutoff device according to Figure 1 in open position allowing the passage of material, the protective tube being retracted.
Figure 3:
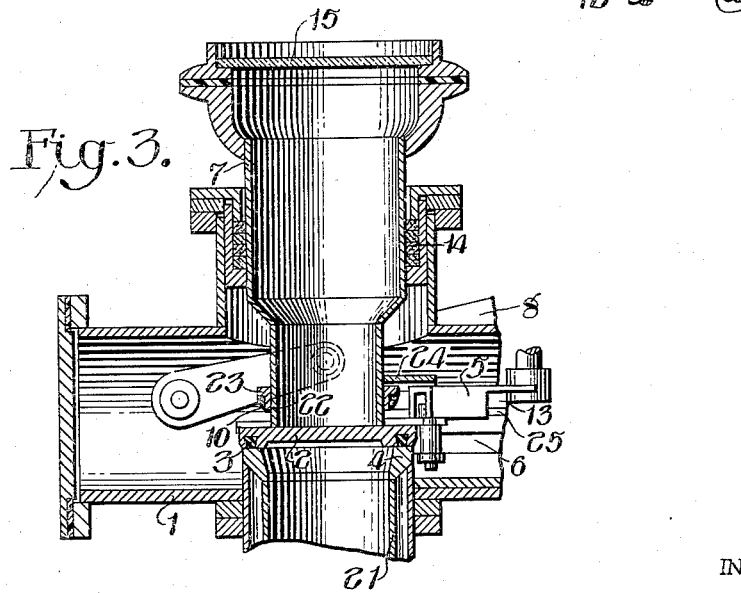
Figure 3 is a side elevation in section of a further mode of construction of the shutoff device which is provided instead with a short feed pipe with a superimposed mounting support and a sight glass.

Since the protective tube 7 which is open at both ends is to be arranged in the valve housing 1 so as to be movable in the axial direction, i.e. along its central axis, the dust-tight connection between the upper part of the valve housing 1 and the end of the protective tube that faces the short feed pipe 20 consists, for example, of a diaphragm seal 11 which may take the form of a filter bag which serves to filter out the dust in the dust-containing substance (see Figures 1 and 2) or a stuffing box 14 (see Figure 3). The protective tube 7 is moved by means of a tension and tightening screw 12 by a crank handle 19 via a lever arrangement 8.

The valve disk 2 is swung in and out by a rocking lever 5 provided with a rotatable handle 18. When the shutoff device is open the valve disk 2 is in space 6 in the interior of the valve housing 1. The valve disk 2 is raised as it is swung away from the outlet or receiving pipe 2 in order to avoid friction between the valve disk and the packing surface at valve seat 4 and thus to prevent the packing 10 from being damaged.

The valve disk 2 is raised by means of a guide rail 13 connected with the valve disk and which is provided with a guide groove 25 for the rocking lever 5 and a bridge 24 serving as entraining means. When the protective tube 7 is further extended, said bridge 24 strikes the back side of the valve ring 23 and can thus be raised slightly together with the guide rail 13 and the valve disk 2 so that the latter can be swung without friction.

In the upper part of the valve housing 1, there are arranged guide members 9, for example plates which are pointing inwards, for laterally guiding the protective tube 7. The rim 22 of that open end of the protective tube 7 which faces the short receiving pipe 21 surmounts the valve ring 23 there located and projects into the short receiving pipe 21 when the shutoff device is open.

At the same time, the packing between the taper bore of the valve seat 4 and the valve ring 23 is tightened by means of the tension and tightening screw 12 via the protective tube 7.

The apparatus of the invention thus enables any dust entrained by the substance passing through the valve to be completely kept away from the packing surfaces so that the latter are not contaminated and damaged. For this purpose, the short feed pipe 20 is provided with a hinged cover 16 for the material, which cover is operated by a lever 17 and prevents any impurities from entering while the protective tube 7 and the valve disk 2 are being operated.

When the short feed pipe 20 is removed or dispensed with, the end of the protective tube 7 that extends from the valve housing 1 may be provided with a mounting support with a sight glass 15 as shown in Figure 3, through which sight glass, for example, dust-producing processes in a gastight space may be observed. When the sight glass 15 is withdrawn in order to be cleaned, the protective tube 7 is extended and the valve disk 2 is swung inwardly in place on the receiving or outlet tube 21 and the short receiving pipe 21 is thus shut.

When the protective tube 7 is arranged in a vertical position the dead weight of the retracted tube may suffice to produce a satisfactory seal in the taper bore of the valve seat 4. In any other position of the protective tube 7 it may, however, be necessary to produce the required packing pressure by means of the tightening screw 12 via the lever arrangement 8. When the protective tube 7 is extended and the valve disk 2 is closed, the protective tube 7 seated upon said valve disk may be used for producing a sufficient packing pressure. With appropriate pressure conditions a sufficient packing may, however, be produced by the gas pressure exerted on the valve disk 2.

I claim:

1. A valve assembly for introducing substances which contain dust into a gastight apparatus wherein the valve assembly packings are protected against contamination by the dust of the substance passing through the assembly, said assembly comprising a walled, gastight, valve housing, an inlet conduit for the housing which extends through one wall of the housing, a feed tube for the substance supported within and by the inlet conduit, an outlet conduit for the housing having one end extending into the housing through the opposite wall to lie in alignment with the feed tube, an axially moveable protective tube positioned within the housing with its axis in alignment with the feed tube and outlet conduit, one end of the protective tube being enlarged so as to encompass with clearance one end of the feed tube, means for moving said protective tube against and away from said one end of the outlet conduit, a swingable valve disc for closing off said one end of the outlet conduit when the protective tube is removed from the said one end thereof, means for moving said valve disc, sealing means positioned between the exterior of the protective tube at the inner side of the inlet conduit to seal off the area adjacent the inlet conduit from the housing interior, and a closure fastened to the feed tube to retain and admit respectively the passage of substances through said one end of the feed tube.

2. The valve assembly of claim 1 comprising a valve seat provided at said one end of the outlet conduit, a valve ring secured to said protective tube adapted to contact said valve seat, and a packing on that surface of said valve ring which contacts said valve seat.

3. The valve assembly of claim 2 wherein the valve seat provided at said one end of the outlet conduit tapers outwardly as it extends toward the protective tube.

4. The valve assembly of claim 1 comprising a packing ring inserted in the surface of said valve disc which contacts said one end of the outlet conduit.

References Cited in the file of this patent

UNITED STATES PATENTS

| | | |
|---|---|---|
| 997,742 | Bolz | July 11, 1911 |
| 1,571,612 | Ward | Feb. 2, 1926 |
| 1,772,803 | Garrett | Aug. 12, 1930 |
| 2,122,642 | Gerdts | July 5, 1938 |
| 2,203,989 | Hamer | June 11, 1940 |

FOREIGN PATENTS

| | | |
|---|---|---|
| 146,097 | Austria | June 10, 1936 |
| 212,961 | Switzerland | Apr. 1, 1941 |